(12) United States Patent
Kubota et al.

(10) Patent No.: US 7,479,527 B2
(45) Date of Patent: Jan. 20, 2009

(54) POLYEPOXIDE AND REACTION PRODUCT OF AMINOALKYLIMIDAZOLE, POLYAMINE, UREA AND DIEPOXIDE AS CURING COMPONENT

(75) Inventors: Masao Kubota, Saitama (JP); Ritaro Nagabuchi, Saitama (JP)

(73) Assignee: Fuji Kasei Kogyo Co., Ltd., Tokyo (JP)

( * ) Notice: Subject to any disclaimer, the term of this patent is extended or adjusted under 35 U.S.C. 154(b) by 336 days.

(21) Appl. No.: 11/461,850

(22) Filed: Aug. 2, 2006

(65) Prior Publication Data

US 2008/0033116 A1 Feb. 7, 2008

(51) Int. Cl.
  *C08G 59/50* (2006.01)
  *C08L 63/02* (2006.01)
(52) U.S. Cl. .................. 525/526; 525/481; 525/527
(58) Field of Classification Search .................. None
  See application file for complete search history.

(56) References Cited

U.S. PATENT DOCUMENTS 5,138,018 A 8/1992 Tashiro et al.
5,200,494 A 4/1993 Kubota et al.

FOREIGN PATENT DOCUMENTS

JP 06-184274 5/2004

JP 2005-206744 A * 8/2005

* cited by examiner

*Primary Examiner*—Robert Sellers
(74) *Attorney, Agent, or Firm*—Heslin Rothenberg Farley & Mesiti P.C.

(57) ABSTRACT

A one-component heat curable epoxide composition which have an excellent storage stability and can be cured in a short period of time at a relatively low temperature, and in particular, have a property of generating outgas in a smaller amount, and providing cured product with an excellent heat resistance, is provided. The composition comprises 100 parts by weight of (A) an epoxide having more than one epoxy group on average in the molecule, and 1 to 40 parts by weight of (B) a curing compound which is prepared by reacting with heating (a) aminoalkylimidazole of the general formula:

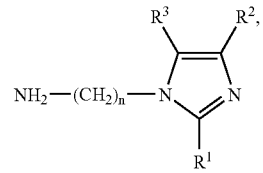

(b) an amine having two nitrogen atoms with one or two active hydrogen atoms and having at least one cyclic structure group in the molecule therein, (c) urea, and (d) a diepoxide having two epoxy groups on average in the molecule.

10 Claims, 1 Drawing Sheet

Figure 1

POLYEPOXIDE AND REACTION PRODUCT OF AMINOALKYLIMIDAZOLE, POLYAMINE, UREA AND DIEPOXIDE AS CURING COMPONENT

BACKGROUND OF THE INVENTION

1. Field of the Invention

Epoxides having more than one epoxy group on average in the molecule, when combined and mixed with various curing agents, may be cured at an ambient temperature or an elevated temperature. Since the cured epoxides exhibit excellent adhesive properties to various materials, they are used in a variety of fields of application, such as adhesives, coatings and impregnants, and in injection, casting and potting. The present invention is intended to provide, in the fields relating to epoxides, epoxide compositions which can be easily handled and have excellent curing characteristics. More specifically, the present invention is intended to provide one-component heat curable epoxide compositions which have an excellent storage stability and can be cured in a short period of time at a relatively low temperature, and in particular, have a property of generating outgas in a smaller amount, and providing cured product with an excellent heat resistance.

2. Description

Most of the conventionally used epoxide compositions are of two-components, and must be used immediately after mixing an epoxide and a curing agent or a curing accelerator. Although two-component epoxide compositions may be cured at room temperature or at a low temperature, they must be precisely weighed and mixed shortly before used. If wrong amounts are weighed relative to the correct amounts of the epoxide and the curing agent, or the subsequent mixing is insufficient even if the correct amounts are weighed, a problem arises in that the properties of the cured product are insufficient. Further, almost all of conventional two-component epoxide compositions have a limitation in applications thereof because of a short pot life, and thus have a disadvantage in that they are difficult to be applied to automated machines. Thus, it is desired to develop one-component heat curable epoxide compositions, to remedy these disadvantages.

One-component heat curable epoxide compositions need a latent-type curing agent which has a property of not reacting with an epoxide at room temperature but of starting a curing reaction upon heating. Some latent-type curing compounds have been proposed, and typically there may be mentioned dicyandiamide, dibasic acid dihydrazides, boron trifluoride amine complex salts, guanamines, melamine and imidazoles. Although mixtures of dicyandiamide, melamine or a guanamine with an epoxide have an excellent storage stability, they have a disadvantage of necessitating a curing condition at a high temperature above 150° C. for a long period of time. Although it is well known to shorten the curing time by the use of a curing accelerator, the addition of the curing accelerator has a disadvantage of an extremely low storage stability. Also, dibasic acid dihydrazides and imidazoles have a poor storage stability even though they cure the epoxide at a relatively low temperature. Boron trifluoride amine complex salts have the advantages of an excellent storage stability and short curing time. But the cured products have a poor resistance to water and cause a corrosion of metals. Thus, each of these curing agents has a disadvantage. Under such circumstances, it is desired to develop an epoxide composition which has an excellent storage stability, can be cured at a low temperature in a short period of time, and exhibits good properties when cured.

To remedy the above disadvantages, Japanese Unexamined Patent Publication No. 3-296525 discloses that a compound, which is prepared by reacting with heating (a) N,N-dialkylaminoalkylamine, (b) an amine having one or two nitrogen atoms with active hydrogen and having a cyclic structure in the molecule thereof, (c) diisocyanate, and (d) an epoxide having more than one epoxy group in the molecule thereof, or which is prepared by reacting with heating the N,N-dialkylaminoalkylamine (a), the amine (b), and the diisocyanate (c), is useful as a latent-type curing agent. The epoxide composition containing this curing agent, however, produces a gas resulting from a residual solvent and low-molecular-weight component, a so-called outgas, when heated. In addition, the heat resistance of the cured product is poor. Japanese Unexamined Patent Publication No. 3-177418 discloses that a compound prepared by reacting with heating (a) a diamine compound having two amino groups, (b) N,N-dialkylaminoalkylamine, (c) an epoxide having more than one epoxy group on average in the molecule thereof, (d)urea, and if necessary (e) a monoamine compound, is useful as a latent-type curing agent. However, the epoxide composition containing the curing agent also produces an outgas from the low-molecular-weight component when heated. In addition, the heat resistance of the cured product is poor. Japanese Unexamined Patent Publication No. 6-184274 discloses that a compound prepared by reacting with heating (a) aminoalkylimidazole (b) an amine having one or two nitrogen atoms with active hydrogen and having a cyclic structure in the molecule thereof, (c) diisocyanate, and (d) an epoxide having more than one epoxy group on average in the molecule, is useful as a latent-type curing agent, and the resulting cured product has an excellent heat resistance. However, the epoxide composition containing the curing agent also produces an outgas from residual solvent and low-molecular-weight component when heated.

SUMMARY OF THE INVENTION

Accordingly, the object of the present invention is to provide one-component heat curable epoxide compositions which have an good storage stability and can be cured in a short period of time at a relatively low temperature, i.e. from 80 to 120° C., and in particular, have a property of generating outgas in a smaller amount, and providing cured product with an excellent heat resistance.

The present invention relates to one-component heat curable epoxide composition which comprises
(A) an epoxide having more than one epoxy group on average in the molecule thereof and
(B) a curing compound which is prepared by reacting with heating
  (a) an aminoalkylimldazole of the general formula:

wherein $R^1$ is a hydrogen atom an alkyl group (preferably an alkyl group having 1 to 20 carbon atoms) or an aryl group (preferably an aryl group having 6 to 10 carbon atoms), $R^2$ is a hydrogen atom or an alkyl group (preferably an alkyl group having 1 to 4 carbon atoms), $R^3$ is a hydrogen atom or an alkyl group (preferably an alkyl group having 1 to 4 carbon atoms) and n is an integer of two or three,
- (b) an amine having two nitrogen atoms with one or two active hydrogen atoms and having at least one cyclic structure group in the molecule thereof,
- (c) urea, and
- (d) a diepoxide having two epoxy groups on average in the molecule thereof More particularly, it relates to one-component heat curable epoxide compositions having an excellent storage stability, and capable of being rapidly cured at a relatively low temperature, and more specifically, having properties such that a generation of outgas is lower and a cured product has an excellent heat resistance.

DESCRIPTION OF THE PREFERRED EMBODIMENTS

The epoxide (A) which is one of the essential components in the present invention has more than one epoxy group on average in the molecule and includes, for example, glycidyl ethers obtained by reacting epichlorohydrin with a polyhydric phenol such as bisphenol A, bisphenol F, bisphenol S, hexahydrobisphenol A, tetramethylbisphenol A, tetramethylbisphenol F, catechol, resorcinol, cresol novolak, tetrabromobisphenol A, trihydroxybiphenyl, benzophenone, bis-resorcinol, bisphenol hexafluoroacetone, hydroquinone, triphenylmethane, tetraphenylethane or bixylenol; polyglycidyl ethers obtained by reacting epichlorohydrin with an aliphatic polyhydric alcohol such as glycerin, neopentyl glycol, ethylene glycol, propylene glycol, butylene glycol, hexylene glycol, polyethylene glycol, polypropylene glycol; glycidyl ether esters obtained by reacting epichlorohydrin with a hydroxycarboxylic acid such as p-hydroxybenzoic acid, beta-hydroxynaphthalene carboxylic acid; polyglycidyl esters obtained from a polycarboxylic acid such as phthalic, methylphthalic, isophthalic, telephthalic, tetrahydrophthalic, hexahydrophthalic, endomethylenetetrahydrophthalic, endomethylenehexahydrophthalic, trimellitic or polymerized fatty acid; glycidylaminoglycidyl ethers obtained from aminophenol or aminoalkylphenol; glycidylaminoglycidyl ester obtained from aminobenzoic acid, glycidylamines obtained from aniline, toluidine, tribromoaniline, xylylenediamine, diaminocyclohexane, bisaminomethylcyclohexane, 4,4'-diaminodiphenylmethane, 4,4'-diaminodiphenyl sulfone or the like; for example, epoxypolyolefin, glycidylhydantoin, glycidylalkylhydantoin, triglycidyl cyanurate, butylglycidyl ether, phenylglycidyl ether, alkylphenylglycidyl ether, glycidyl ester of benzoic acid, styrene oxide or the like; or mixtures thereof The curing compound (B), which is the other essential component in the present invention, may be prepared by reacting with heating (a) aminoalkylimidazole, (b) an amine having two nitrogen atoms with one or two active hydrogen atoms and having at least one cyclic structure group in the molecule, (c) urea, and (d) a diepoxide having two epoxy groups on average in the molecule.

The aminoalkylimidazole (a) which may be used in the present invention has a structure of the general formula:

wherein $R^1$ is a hydrogen atom alkyl group or aryl group, $R^2$ is a hydrogen atom or alkyl group, $R^3$ is a hydrogen atom or alkyl group and n is an integer of two or three.

As examples of the aminoalkylimidazole (a), there may be mentioned 1-(2-aminoethyl)-2-methylimidazole, 1-(2-aminoethyl)-2-ethylimidazole, 1-(3-aminopropyl)imidazole, 1-(3-aminopropyl)-2-methylimidazole, 1-(3-aminopropyl)-2-ethylimidazole, 1-(3-aminopropyl)-2-phenylimidazole, 1-(3-aminopropyl)-2-heptadecylimidazole, 1-(3-aminopropyl)-2,4-dimethylimidazole, 1-(3-aminopropyl)-2,5-dimethylimidazole, 1-(3-aminopropyl)-2-ethyl-4-methylimidazole, 1-(3-aminopropyl)-2-ethyl-5-methylimidazole, 1-(3-aminopropyl)-4-methyl-2-undecylimidazole, 1-(3-aminopropyl)-5-methyl-2-undecylimidazole, and the like. Of the above compounds, 1-(2-aminoethyl)-2-methylimidazole is particularly preferred.

As the amine (b) having two nitrogen atoms with one or two active hydrogen atoms and having at least one cyclic structure group in the molecule, there may be mentioned polyamines such as metaxylylenediamine, 1,3-bis-(aminomethyl)cyclohexane, isophoronediamine, diaminocyclohexane, phenylenediamine, tolylenediamine, diaminodiphenylmethane, diaminodiphenyl sulfone, piperazine, N-aminoethylpiperidine, or the like. Of these amine components, isophoronediamine is particularly preferred.

A group "nitrogen atom with one or two active hydrogen atoms" as used herein means a primary amino group (—$NH_2$) and secondary amino group (—NHR).

The cyclic structure group may be an aromatic group have 6-12 carbon atoms, such as phenyl, naphthyl, biphenyl, diphenyl methyl, or diphenyl sulfone group; a cycloalkyl group having 5-8 carbon atoms, such as cyclopentyl, cyclohexyl, cycloheptyl, or cyclooctyl group; or 5-memberd to 8-memberd saturated heterocyclic group having at least one nitrogen atom and optionally one or more oxygen or sulfur atoms such as pyrazolidinyl, piperidinyl or piperazinyl group.

As the diepoxide (d) used in the preparation of the above curing compound (B), diepoxide compound having two epoxy groups on average in the molecule thereof may be selected from the epoxide compounds exemplified in the explanation of the epoxide (A) having more than one epoxy group on average in the molecule thereof Of these epoxides, a bisphenol A type diepoxide having an epoxy equivalent weight of about 190, and a bisphenol F type diepoxide having an epoxy equivalent weight of about 175, are particularly preferred.

The curing compound (B) used in the present invention may be synthesized basically as follows. An addition reaction of the amine (b) having two nitrogen atoms with one or two active hydrogen atoms and having at least one cyclic structure group in the molecule, and the diepoxide (d) having two epoxy groups on average in the molecule is carried out at preferably 50 to 150° C., more preferably 80 to 130° C., for 1 to 3 hours. Subsequently, the aminoalkylimidazole (a) and urea(c) are added thereto, and a deammoniation reaction is carried out at preferably 150 to 240° C., more preferably 160 to 220° C., for 1 to 5 hours. The resulting product is solid and may be pulverized into a desired particle size.

In the curing compound (B) prepared by reacting the aminoalkylimidazole (a), the amine (b) having two nitrogen atoms with one or two active hydrogen atoms and having at least one cyclic structure group in the molecule, urea (c), and the diepoxide (d) having two epoxy groups on average in the molecule, the molar ratio [(b)/(a)] of the amine (b) to the aminoalkylimidazole (a) is preferably 0.4:1 to 12.0:1, more preferably 0.5:1 to 10.0:1. When the amount of the amine (b) is smaller than 0.4:1 mole or greater than 12.0:1 moles per one mole of the aminoalkylimidazole (a), the product has a poor storage stability.

The molar ratio of urea (c) to the sum of the nitrogen atoms with two active hydrogen atoms in the aminoalkylimidazole (a) and the nitrogen atoms with one or two active hydrogen atoms in the amine (b) is preferably 0.1:1 to 0.6:1, more preferably 0.2:1 to 0.5:1 with respect to a molar ratio of urea (c) per one nitrogen atom. When the amount of the urea (c) used is smaller than 0.1:1 mole, the product has a poor storage stability. When the amount of the urea (c) used is greater than 0.6:1 mole, the molecular weight of the product is increased and the product will gelate. The chemical equivalent ratio of the diepoxide (d) to the sum of the nitrogen atoms with two active hydrogen atoms in the aminoalkylimidazole (a) and the nitrogen atoms with one or two active hydrogen atoms in the amine (b) is preferably 0.01:1 to 0.6:1, preferably 0.02:1 to 0.5:1, with respect to a chemical equivalent ratio of the diepoxide (d) per one nitrogen atom. When the amount of the diepoxide (d) used is smaller than 0.01:1 chemical equivalent, a curing property of the product at a low temperature is insufficient. When the amount of the diepoxide (d) used is greater than 0.6:1 chemical equivalent, the molecular weight of the product is increased and the product will gelate. In addition, a ratio of the sum of the number of the —$NH_2$ groups in urea (c) and the number of the epoxy groups in the diepoxide (d) to the sum of the nitrogen atoms with two active hydrogen atoms in the aminoalkylimidazole (a) and the nitrogen atoms with one or two active hydrogen atoms in the amine (b) is preferably 0.8:1 to 1.4:1 per one nitrogen atom. When the sum of the number of the —$NH_2$ groups and the epoxy groups is smaller than 0.8:1, the product has a poor storage stability. When the sum of the number of the —$NH_2$ groups and the epoxy groups is greater than 1.4:1, the molecular weight of the product is increased and the product will gelate.

The heat curable epoxide composition of the present invention can be basically obtained by mixing the powdery curing compound (B) with and dispersing in the epoxide (A). When the epoxide (A) is liquid, it is preferred to blend the curing compound (B) therewith in a predetermined ratio, and then sufficient mixing and dispersing are carried out by a device like a mortar. When the epoxide (A) is solid, it is preferred to use a preliminarily finely crushed epoxide (A) and mix it sufficiently with the curing compound (B).

The blending amount of the curing compound (B) to the epoxide (A) may differ dependently on the type of the epoxide (A), particularly the concentration of the epoxy groups in the epoxide (A), and may be within the range of 1 to 40 parts by weight relative to 100 parts by weight of the epoxide (A).

In addition, the one-component heat curable epoxide composition can be used concurrently with various conventional curing agents known as a latent-type curing agent such as acid anhydrides, dicyandiamide, dibasic acid dihydrazides, guanamines, melamine, imidazoles, and the like. Further, if necessary, other additives may be optionally added to the one-component heat curable epoxide composition of the present invention. As such additives, there may be mentioned inorganic powdery materials such as alumina, silica, silicate pigment, talc, bentonite, calcium carbonate, and cement; asbestos, glass fibers, synthetic fibers, mica, metal powder, as well as a thixotropic agent or similar materials. Further, if necessary, other diluent and flame retardants may be added to the composition.

The one-component heat curable epoxide composition of the present invention has an excellent storage stability and can be cured in a short period of time at a relatively low temperature. More particularly, any generation of outgas is lowered, and the heat resistance of the cured compound is excellent.

EXAMPLES

The present invention will now be further illustrated by, but is by no means limited to, the following Examples.

Curing Compound Preparation 1

In a four-necked flask equipped with a thermometer, a reflux condenser, a stirrer, a nitrogen inlet device and a dropping funnel, 289.0 g (1.7 moles) of isophoronedlamme were charged and then heated at 100° C. while blowing nitrogen. Thereafter, while maintaining the temperature and vigorously mixing, 52.5 g (0.3 chemical equivalent) of EPICLON 830 (DAINIPPON INK AND CHEMICALS, INCORPORAED; bisphenol F type epoxide having an epoxy equivalent weight of about 175) was added drop wise from the dropping funnel. After the addition was completed, the mixture was allowed to stand at 120° C. for 2 hours whereby the reaction was completed. Then, 250 g (2.0 moles) of 1-(2-aminoethyl)-2-methylimidazole and 162.0 g (2.7 moles) of urea were added thereto, and the whole was heated gradually to 200° C. with mixing, and then allowed to stand at that temperature for 2 hours. The resulting product was a transparent bistered solid which could be readily crushed. The obtained curing compound was designated as A.

Curing Compound Preparation 2

In a four-necked flask equipped with a thermometer, a reflux condenser, a stirrer, a nitrogen inlet device and a dropping funnel, 187.0 g (1.1 moles) of isophoronediamine were charged and then heated at 100° C. while blowing nitrogen. Thereafter, while maintaining the temperature and vigorously mixing, 140.0 g (0.8 chemical equivalent) of EPICLON 830 was added drop wise from the dropping funnel. After the addition was completed, the mixture was allowed to stand at 120° C. for 2 hours whereby the reaction was completed. Then, 250.0 g (2.0 moles) of 1-(2-aminoethyl)-2-methylimidazole and 126.0 g (2.1 moles) of urea were added thereto, and the whole was gradually heated to 200° C. with mixing, and then allowed to stand at that temperature for 2 hours. The resulting product was a transparent bistered solid which could be readily crushed. The obtained curing compound was designated as B.

Curing Compound Preparation 3

In a four-necked flask equipped with a thermometer, a reflux condenser, a stirrer, a nitrogen inlet device and a dropping funnel, 187.0 g (1.1 moles) of isophoronediamine were charged and then heated at 100° C. while blowing nitrogen. Thereafter, while maintaining the temperature and vigorously mixing, 175.0 g (1.0 chemical equivalent) of EPICLON 830 was added drop wise from the dropping funnel. After the addition was completed, the mixture was allowed to stand at 120° C. for 2 hours whereby the reaction was completed. Then, 187.5 g (1.5 moles) of 1-(2-aminoethyl)-2-methylimidazole and 90.0 g (1.5 moles) of urea were added thereto, and the whole was gradually heated to 200° C. with mixing and allowed to stand at that temperature for 2 hours. The resulting product was a transparent bistered solid which could be readily crushed. This obtained curing compound was designated as C.

Curing Compound Preparation 4

In a four-necked flask equipped with a thermometer, a reflux condenser, a stirrer, a nitrogen inlet device and a dropping funnel, 187.0 g (1.1 moles) of isophoronediamine were charged and then heated at 100° C. while blowing nitrogen. Thereafter, while maintaining the temperature and vigorously mixing, 190.0 g (1.0 chemical equivalent) of ARALDITE AER-260 (ASAHI CIBA; blsphenol A type epoxide having an epoxy equivalent weight of about 190) was added drop wise from the dropping funnel. After the addition was completed, the mixture was allowed to stand at 120° C. for 2 hours whereby the reaction was completed. Then, 187.5 g (1.5 moles) of 1-(2-aminoethyl)-2-methylimidazole and 90.0 g (1.5 moles) of urea were added thereto, and the whole was gradually heated to 200° C. with mixing and allowed to stand at that temperature for 2 hours. The resulting product was a transparent bistered solid which could be readily crushed. This obtained curing compound was designated as D.

Curing compound Preparation 5

In a four-necked flask equipped with a thermometer, a reflux condenser, a stirrer, a nitrogen inlet device and a dropping funnel, 2040.0 g (12.0 moles) of isophoronediamine were charged and then heated at 100° C. while blowing nitrogen. Thereafter, while maintaining the temperature and vigorously mixing, 2100.0 g (12.0 chemical equivalents) of EPICLON 830 was added drop wise from the dropping funnel. After the addition was completed, the mixture was allowed to stand at 120° C. for 2 hours whereby the reaction was completed. Then, 187.5 g (1.5 moles) of 1-(2-aminoethyl)-2-methylimidazole and 312.0 g (5.2 moles) of urea were added thereto, and the whole was gradually heated to 200° C. with mixing, and allowed to stand at that temperature for 2 hours. The resulting product was a transparent bistered solid which could be readily crushed. This obtained curing compound was designated as E.

Comparative Curing Compound Preparation 1

In a four-necked flask equipped with a thermometer, a reflux condenser, a stirrer, a nitrogen inlet device and a dropping funnel, were charged 68.0 g (0.4 mole) of isophoronediamine, 149.8 g (1.4 moles) of benzylamine, 570.3 g of isobutanol and 570.3 g of xylene. Then, the mixture was heated at 100° C. while blowing nitrogen. Thereafter, while maintaining the temperature and vigorously mixing, 380.0 g (2.0 chemical equivalents) of ARALDITE AER-260 was added drop wise from the dropping funnel. After the addition was completed, the mixture was allowed to stand at 100° C. for 2 hours whereby the reaction was completed. Then, 187.5 g (1.5 moles) of 1-(2-aminoethyl)-2-methylimidazole was added thereto. Thereafter, while vigorously mixing at 100° C., 355.2 g (1.6 moles) of isophoronediisocyanate was added drop wise from the dropping funnel. After the addition was complete, a reaction was carried out while refluxing isobutanol and xylene until free isocyanate was confirmed to be absent. Thereafter, the mixture was heated to 200° C. isobutanol and xylene was removed in vacuo. The resulting product was a transparent pale yellow solid which could be readily crushed. This obtained curing compound was designated as F.

Comparative Curing Compound Preparation 2

In a four-necked flask equipped with a thermometer, a reflux condenser, a stirrer, a nitrogen inlet device and a dropping funnel, were charged 187.0 g (1.1 moles) of isophoronediamine, 526.9 g of isobutanol and 526.9 g of xylene. Then, the mixture was heated at 100° C. while blowing nitrogen. Thereafter, while maintaining the temperature and vigorously mixing, the mixture of 114.0 g (0.6 chemical equivalent) of ARALDITE AER-260 and 210.0 g (1.4 chemical equivalent) of phenyl glycidyl ether was added drop wise from the dropping funnel. After the addition was completed, the mixture was allowed to stand at 100° C. for 2 hours whereby the reaction was completed. Then, 187.5 g (1.5 moles) of 1-(2-aminoethyl)-2-methylimidazole was added thereto. Thereafter, while vigorously mixing at 100° C., 355.2 g (1.6 moles) of isophoronediisocyanate was added drop wise from the dropping funnel. After the addition was completed, the reaction was carried out while refluxing isobutanol and xylene until free isocyanate was confirmed to be absent. Thereafter, they were heated to 200° C. and isobutanol and xylene was removed in vacuo. The resulting product was a transparent pale yellow solid which could be readily crushed. This obtained curing compound was designated as G.

Comparative Curing compound Preparation 3

In a four-necked flask equipped with a thermometer, a reflux condenser, a stirrer, a nitrogen inlet device and a dropping funnel, were charged 187.0 g (1.1 moles) of isophoronediamine, 448.8 g of isobutanol and 448.8 g of xylene. Then, the mixture was heated to 100° C. while blowing nitrogen. Thereafter, while maintaining the temperature and vigorously mixing, 190.0 g (1.0 chemical equivalent) of ARALDITE AER-260 was added drop wise from the dropping funnel. After the addition was completed, the mixture was allowed to stand at 100° C. for 2 hours whereby the reaction was completed. Then, 187.5 g (1.5 moles) of 1-(2-aminoethyl)-2-methylimidazole was added thereto. Thereafter, while vigorously mixing at 100° C., 333.0 g (1.5 moles) of isophoronediisocyanate was added drop wise from the dropping funnel. In this case, the dropping was stopped because an insoluble product was generated immediately just after the dropping. Therefore, a curing compound could not be prepared.

Example 1

The curing compound A obtained in Curing Compound Preparations 1 was finely divided and added to and dispersed in 100 parts by weight of ARALDITE AER-260 together with 1 part by weight of AEROSIL 300 (a product of Nippon Aerosil K.K., a particulate silica), and the composition was examined for curing property, heat resistance, storage stability, and outgas generation.

Example 2

The procedure of Example 1 was repeated except that the curing compound B obtained in Curing Compound Preparation 2 was used instead of curing compound A.

Example 3

The procedure of Example 1 was repeated except that the curing compound C obtained in Curing Compound Preparation 3 was used instead of curing compound A.

Example 4

The procedure of Example 1 was repeated except that the curing compound D obtained in Curing Compound Preparation 4 was used instead of curing compound A.

Example 5

The procedure of Example 1 was repeated except that the curing compound E obtained in Curing Compound Preparation 5 was used instead of curing compound A.

Comparative Examples 1 and 2

The curing compounds F and G obtained m Comparative Curing Compound Preparations 1 and 2 were finely divided and added to and dispersed in 100 parts by weight of ARALDITE AER-260 together with 1 part by weight of AEROSIL 300, and these compositions were examined for curing property, heat resistance, storage stability, and outgas generation.

Comparative Example 3

Five parts by weight of 1-(2-aminoethyl)-2-methylimidazole (abbreviated to H) were added to and dispersed in 100 parts by weight of ARALDITE AER-260 together with 1 part by weight of AEROSIL 300, and these compositions were tested for curing property, heat resistance, and storage stability.

Evaluation of Curing Property.

Gelation time of approximately 2 g of a sample for a resulting product on each temperature set up was examined by a GEL TIME TESTER (Yasuda Seiki Seisakusho, Ltd).

Evaluation of Heat Resistance.

Each sample was heated to 250° C. at a temperature rising speed of 5° C./minute by using a DSC (Seiko Instruments Inc.). The resulting product was heated again at a temperature rising speed of 5° C./minute and a glass transition point was determined by an obtained DSC curve Storage Stability A viscosity change of a sample was examined when the sample was maintained at 40° C. in a incubator. The viscosity was measured at 25° C. The number of days necessary for reaching a viscosity twice that of the initial viscosity were examined.

Measurement of Generation of Outgas.

The generation of outgas was measured by the headspace method of GC/MS (JEOL Ltd.) after heating at 150° C. for one hour.

Figure 1:
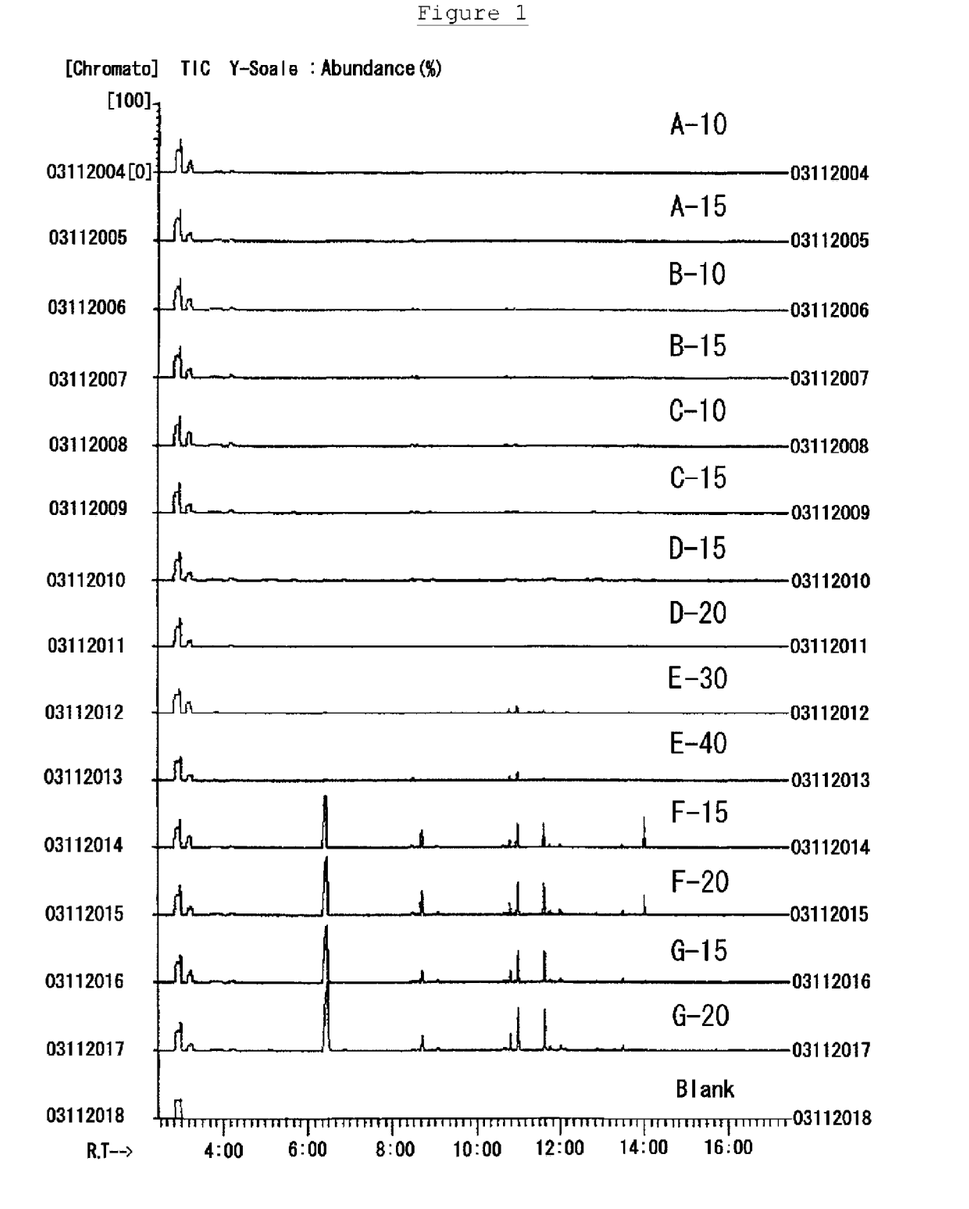
FIG. 1 illustrates charts showing the results of the measurements of the outgases generated from samples after heated at 150° C. for 1 hour, by means of the headspace method of GC/MS (JEOL Ltd.).

The results of the curing property, heat resistance and storage stability obtained are shown in Table 1 and the results of the generation of outgas are shown in FIG. 1.

The results of the measurement of outgas are shown in FIG. 1, and the peaks of various outgas components, such as isobutanol (retention time shown by a horizontal axis in Fig. is 6:20), xylene (10:40-11:40), benzylamine (14:00) and the like as a residual solvent from samples of Comparative Examples 1 and 2 (F-15 to G-20 in FIG. 1: alphabet characters indicate the curing agent, and numbers to the right thereof indicate a rate in a composition), were observed, as compared to Examples 1 to 5 (A-10 to E-40 in FIG. 1). In comparative Curing Compound Preparation 3 corresponding to Curing Compound Preparation 4, 1-(2-aminoethyl)-2-methylimidazole was added to the reaction product of isophoronediamine and ARALDITE AER-260, and subsequently, when isophoronediisocyanate was reacted by dropping same therewith, the molecular weight of the reaction product was drastically increased and the reaction product was insolubilized to a solvent, since monoamine and/or monoepoxide for regulating a molecular weight did not exist therein. Therefore, it was found that a curing compound corresponding to that prepared in Curing Compound Preparation 4 could not be prepared.

As illustrated above, it is obvious that the present invention can provide one-component heat curable epoxide compositions which have an excellent storage stability and can be cured in a short period of time at a relatively low temperature, and in particular, have a property of generating outgas in a smaller amount, and providing cured product with an excellent heat resistance Since the cured epoxides exhibit excellent adhesive properties to various materials, the one-component heat curable epoxide compositions of the present invention can be used in a variety of fields of application such as adhesives, coatings, and impregnants, and in injection, casting and potting.

As above, the present invention was explained with reference to particular embodiments, but modifications and improvements obvious to those skilled in the art are included in the scope of the present invention.

What we claim is:

1. A one-component heat curable epoxide composition which comprises
   (A) an epoxide having more than one epoxy group on average in the molecule thereof, and

TABLE 1

| | Curing compound | | Gelation Time (minutes) | | | Glass transition point | Storage stability |
|---|---|---|---|---|---|---|---|
| | Abbreviated name | Parts by weight | 120° C. | 100° C. | 80° C. | (° C.) | (Days) |
| Example 1 | A | 10 | 2.8 | 6.1 | 60< | 151.9 | 30< |
| | | 15 | 2.6 | 5.1 | 60< | 146.0 | 22 |
| Example 2 | B | 10 | 2.5 | 4.6 | 18.5 | 150.8 | 30< |
| | | 15 | 2.2 | 3.9 | 14.1 | 138.8 | 21 |
| Example 3 | C | 10 | 2.5 | 4.6 | 17.7 | 151.6 | 30< |
| | | 15 | 2.3 | 3.8 | 13.1 | 145.4 | 30< |
| Example 4 | D | 15 | 2.3 | 3.9 | 15.1 | 151.4 | 30< |
| | | 20 | 1.9 | 3.5 | 12.4 | 140.7 | 30< |
| Example 5 | E | 30 | 3.0 | 4.3 | 8.3 | 153.6 | 30< |
| | | 40 | 2.3 | 3.8 | 10.6 | 148.2 | 30< |
| Comparative Example 1 | F | 15 | 2.6 | 5.0 | 20.6 | 153.4 | 30< |
| | | 20 | 2.4 | 4.3 | 18.5 | 150.0 | 30< |
| Comparative Example 2 | G | 15 | 3.0 | 5.0 | 23.0 | 148.3 | 30< |
| | | 20 | 2.4 | 4.5 | 20.3 | 141.3 | 30< |
| Comparative Example 3 | H | 5 | 2.4 | 4.0 | 21.8 | 148.0 | <1 |

(B) a curing compound which is prepared by reacting with heating
(a) an aminoalkylimidazole of the general formula:

wherein $R^1$ is a hydrogen atom, an alkyl group or an aryl group, $R^2$ is a hydrogen atom or an alkyl group, $R^3$ is a hydrogen atom or an alkyl group and n is an integer of two or three,
(b) an amine having two nitrogen atoms with one or two active hydrogen atoms and having at least one cyclic structure group in the molecule thereof,
(c) urea, and
(d) a diepoxide having two epoxy groups on average in the molecule thereof.

2. The one-component heat curable epoxide composition according to claim 1, wherein the curing compound (B) is prepared by carrying out an additional reaction of the amine (b) having two nitrogen atoms with one or two active hydrogen atoms and having at least one cyclic structure group in the molecule, with the diepoxide (d) having two epoxy groups on average in the molecule thereof, at 50 to 150° C., for 1 to 3 hours, subsequently adding the aminoalkylimidazole(a) and urea(c) thereto; and carrying out a deammoniation reaction at 150 to 240° C., for 1 to 5 hours.

3. The one-component heat curable epoxide composition according to claim 1, wherein in the reaction for preparing said curing compound, a molar ratio of said amine (b) to said aminoalkylimidazole (a) is 0.4:0.1 to 12.0:0.1.

4. The one-component heat curable epoxide composition according to claim 1, wherein in the reaction for preparing said curing compound, the molar ratio of urea (c) to the sum of the nitrogen atoms with two active hydrogen atoms in the aminoalkylimidazole (a) and the nitrogen atoms with one or two active hydrogen atoms in the amine (b) is 0.1:0.1 to 0.6:0.1, with respect to a molar ratio of urea (c) per one nitrogen atom.

5. The one-component heat curable epoxide composition according to claim 1, wherein in the reaction for preparing said curing compound, the chemical equivalent ratio of the diepoxide (d) to the sum of the nitrogen atoms with two active hydrogen atoms in the aminoalkylimidazole (a) and the nitrogen atoms with one or two active hydrogen atoms in the amine (b) is 0.01:0.1 to 0.6:0.1, with respect to a chemical equivalent ratio of the diepoxide (d) per one nitrogen atom.

6. The one-component heat curable epoxide composition according to claim 1, wherein in the reaction for preparing said curing compound, a ratio of the sum of the number of the —$NH_2$ groups in urea (c) and the number of the epoxy groups in the diepoxide (d) to the sum of the nitrogen atoms with two active hydrogen atoms in the aminoalkylimidazole (a) and the nitrogen atoms with one or two active hydrogen atoms in the amine (b) is 0.8:0.1 to 1.4:0.1.

7. The composition according to claim 1, wherein said epoxide (A) is at least one compound selected from the group consisting of, polyglycidyl ether, polyglycidyl ether ester, polyglycidyl ester, glycidylaminoglycidyl ether, glycidylaminoglycidyl ester, polyglycidylamine, and.

8. The composition according to claim 1, wherein said aminoalkylimidazole (a) is at least one compound selected from the group consisting of 1-(2-aminoethyl)-2-methylimidazole, 1-(2-aminoethyl)-2-ethylimidazole, 1-(3-aminopropyl)imidazole, 1-(3-aminopropyl)-2-methylimidazole, 1-(3-aminopropyl)-2-ethylimidazole, 1-(3-aminopropyl)-2-phenylimidazole, 1-(3-aminopropyl)-2-heptadecylimidazole, 1-(3-aminopropyl)-2,4-dimethylimidazole, 1-(3-aminopropyl)-2,5-dimethylimidazole, 1-(3-aminopropyl)-2-ethyl-4-methylimidazole, 1-(3-aminopropyl)-2-ethyl-5-methylimidazole, 1-(3-aminopropyl)-4-methyl-2-undecylimidazole, and 1-(3-aminopropyl)-5-methyl-2-undecylimidazole.

9. The composition according to claim 1, wherein said amine (b) is at least one compound selected from the group consisting of metaxylylenediamine, 1,3-bis-(aminomethyl)cyclohexane,isophoronediamine, diaminocyclohexane, phenylenediamine, tolylenediamine, diaminodiphenylmethane, diaminodiphenyl sulfone, piperazine, and N-aminoethylpiperidine.

10. The composition according to claim 1, wherein said diepoxide (d) is at least one compound selected from the group consisting of bisphenol A diepoxide having an epoxy equivalent weight of about 190, and bisphenol F diepoxide having an epoxy equivalent weight of about 175.

* * * * *

UNITED STATES PATENT AND TRADEMARK OFFICE
CERTIFICATE OF CORRECTION

PATENT NO. : 7,479,527 B2
APPLICATION NO. : 11/461850
DATED : January 20, 2009
INVENTOR(S) : Kubota et al.

It is certified that error appears in the above-identified patent and that said Letters Patent is hereby corrected as shown below:

In the Specifications:

Col. 3, Line 54: delete "like: for example, epoxypolyolefin" and insert
-- like: epoxypolyolefin --

Col. 5, Line 8: delete "ratio [(b)/(a)] of the amine" and insert -- ratio [(b):(a)] of the amine --

In the Claims:

Claim 3: Col. 11, Line 37: delete "(a) is 0.4:0.1 to 12.0:0.1" and insert -- (a) is 0.4:1 to 12.0:1 --

Claim 4: Col. 11, Lines 43-44: delete "(b) is 0.1:0.1 to 0.6:0.1," and insert -- (b) is 0.1:1 to 0.6:1, --

Claim 5: Col. 12, Line 5: delete "(b) is 0.01:0.1 to 0.6:0.1," and insert -- (b) is 0.01:1 to 0.6:1, --

Claim 6: Col. 12, Line 14: delete "(b) is 0.8:0.1 to 1.4:0.1." and insert -- (b) is 0.8:1 to 1.4:1. --

UNITED STATES PATENT AND TRADEMARK OFFICE
CERTIFICATE OF CORRECTION

PATENT NO. : 7,479,527 B2
APPLICATION NO. : 11/461850
DATED : January 20, 2009
INVENTOR(S) : Kubota et al.

It is certified that error appears in the above-identified patent and that said Letters Patent is hereby corrected as shown below:

Claim 7: Col. 12, Lines 17-19: delete "consisting of, polyglycidyl ether, polyglycidyl ether ester, polyglycidyl ester, glycidylaminoglycidyl ether, glycidylaminoglycidyl ester, polyglycidylamine, and." and insert -- consisting of, polyglycidyl ether, polyglycidyl ester, glycidylaminoglycidyl ether, glycidylaminoglycidyl ester and polyglycidylamine. --

Signed and Sealed this

Twenty-sixth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,479,527 B2
APPLICATION NO. : 11/461850
DATED : January 20, 2009
INVENTOR(S) : Kubota et al.

It is certified that error appears in the above-identified patent and that said Letters Patent is hereby corrected as shown below:

Col. 4, Line 35: Delete "N-aminoethylpiperidine or the like," and insert
-- N-aminoethylpiperazine or the like --

Claim 9, Col. 12, Lines 39 & 40: Delete "and N-aminoethylpiperidine" and insert
-- and N-aminoethylpiperazine --

Signed and Sealed this

Twenty-ninth Day of December, 2009

David J. Kappos
*Director of the United States Patent and Trademark Office*